Patented Apr. 11, 1933

1,903,709

UNITED STATES PATENT OFFICE

MURK JAN SCHOEN, OF ZAANDAM, NETHERLANDS

TIGHTENING COMPOSITION

No Drawing. Application filed July 11, 1931, Serial No. 550,290, and in the Netherlands July 14, 1930.

My invention relates to a process for preparing a tightening means or composition for use in fixing in panes of glass in window-frames, fissures and the like.

The various putties used up to now to this purpose often give rise to disappointment, particularly when applied for fixing in panes of glass in modern steel window-frames, which are often applied at the inner side. It repeatedly occurs that the usual putty flows down or wrinkles and superficially sets under formation of bladders, the inner portion of the putty remaining soft.

It has already been repeatedly tried to remove these drawbacks of the usual putties by applying so-called minium-putty. As such kinds of putty also only superficially set, the results were unsatisfactory.

If these known kinds of putty are painted over after the first superficial drying, the subsequent setting of the putty is entirely excluded, since the air can no more penetrate into the putty.

According to my invention an improved composition is prepared, which does not possess these drawbacks.

The improved composition consists in two different pastes, which are separately prepared and are mixed shortly before use, viz. a tightening paste proper and a setting paste; the first one consisting in a mixture of chalk (or other carbonates, e. g. Mg, Ba, Sr carbonate), linseed-oil (or other drying oils), glycerine or another polyvalent alcohol and optionally a soap, whereas, if desired, also mineral oils or the like may be added.

The second paste consists of litharge and water, to which optionally a filler—such as infusorial-earth—and a plastifying means (such as soap, mineral oils and the like) may be added.

It is observed that glycerine—(glycol)—lead putties are known. However, these kinds of putties so rapidly set that they cannot be previously prepared.

The composition prepared according to my invention has satisfactorily set within a few days. The setting does not superficially occur by oxidation at the air, but from within, throughout the entire mass, by a chemical reaction between the litharge and the polyvalent alcohol, so that, also directly after painting, the composition readily sets.

Now some examples will be given of compositions, which may be used as components of my paste:—

Component I 100 parts by weight of chalk,
14 parts by weight of crude linseed-oil,
2 parts by weight of cooked linseed-oil,
0.6 parts by weight of potassium-oleate,
30 parts by weight of glycol.

Component II 2000 parts by weight of litharge,
67.5 parts by weight of infusorial earth,
135 parts by weight of water,
135 parts by weight of potassium oleate.

Both components are separately kneaded to a single homogeneous mass. Shortly before the use of the composition, 10 parts by weight of Component I are kneaded together also to a completely homogeneous mass with 1 part by weight of Component II, which is then ready for use.

The said 30 parts by weight of glycol in Component I may also be replaced by another polyvalent alcohol, for instance by 20 parts by weight of glycerine.

If a smaller proportion of the polyvalent alcohol is used, then the same effect is obtained, but correspondingly the setting requires a larger period. Therefore the plasticity may, besides of the addition of the plastifying means (e. g. potassium oleate) be varied by the addition of a smaller or larger proportion of the alcohol to Component I. In this way the quality of the composition may be put in accordance with the technical requirements.

I claim:—

1. A tightening composition for use in fixing-in panes of glass in window frames, tightening of fissures and like purposes, consisting in a homogeneous mixture of two separate pastes to wit: as the first paste a mixture of a water insoluble carbonate, a drying oil, a polyvalent alcohol and a plastifying means; as the second paste a mixture of litharge and water.

2. A tightening composition for use in fixing-in panes of glass in window frames, tightening of fissures and like purposes, consisting in a homogeneous mixture of two separate pastes to wit: as the first paste a mixture of a water insoluble carbonate, a drying oil, a polyvalent alcohol and a plastifying means; as the second paste a mixture of litharge, water and filler.

3. A tightening composition for use in fixing-in panes of glass in window frames, tightening of fissures and like purposes, consisting in a homogeneous mixture of two separate pastes to wit: as the first paste a mixture of a water insoluble carbonate, a drying oil, a polyvalent alcohol and a plastifying means; as the second paste a mixture of litharge, water, a filler and a plastifying means.

4. A process for preparing a tightening composition for use in fixing-in panes of glass in window frames, for tightening of fissures and like purposes, which process consists in homogeneously mixing, shortly before using, two component pastes, the first of said pastes comprising a mixture of approximately 100 parts of chalk, 14 parts of crude linseed oil, 2 parts of cooked linseed oil, 0.6 parts of potassium-oleate and 30 parts of glycol, all by weight; the second paste comprising approximately 2000 parts of litharge, 67.5 parts of infusorial earth, 135 parts of water and 135 parts of potassium-oleate, all by weight; each of said component pastes being separately kneaded, finally mixing into a homogeneous mass about 10 parts of said first paste together with 1 part of the second paste.

In testimony whereof I affix my signature.

MURK JAN SCHOEN.